(12) United States Patent
Masui et al.

(10) Patent No.: US 6,532,156 B1
(45) Date of Patent: Mar. 11, 2003

(54) PORTABLE RADIOTELEPHONE EQUIPPED WITH A CONNECTOR HAVING EJECTION MECHANISM AND DETECTION SWITCH

(75) Inventors: Shoichiro Masui, San Diego, CA (US); Lee Hunter, Lantana, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/037,965

(22) Filed: Dec. 21, 2001

(51) Int. Cl.$^7$ .................. H05K 5/06; H01R 29/00
(52) U.S. Cl. .................. 361/733; 732/740; 732/747; 732/769; 732/781; 439/188; 439/923
(58) Field of Search .................. 361/685, 726, 361/732, 733, 737, 740–741, 747, 752, 756, 759, 769, 781, 801, 802, 816, 818, 798–799, 753; 312/223.1, 223.2; 211/41.17, 26.2; 439/630, 188, 923, 159, 155, 152, 328

(56) References Cited

U.S. PATENT DOCUMENTS

| | | |
|---|---|---|
| 5,179,505 A | 1/1993 | Matsuo |
| 5,657,081 A | 8/1997 | Kurahashi |
| 6,240,301 B1 * | 5/2001 | Phillips ............... 455/550 |
| 6,336,588 B1 * | 1/2002 | Reichardt et al. ....... 235/475 |

* cited by examiner

*Primary Examiner*—David Martin
*Assistant Examiner*—Phuong T. Vu
(74) *Attorney, Agent, or Firm*—Shigeharu Furukawa

(57) ABSTRACT

The present invention describes a portable radiotelephone (100) equipped with a connector having an ejection mechanism and a detect switch for an insertable module. The connector (500) is simple in design and may be constructed from a single piece of metal sheet. A module (102), which adds functionality to the portable radiotelephone, is inserted into a module slot (104) of the portable radiotelephone. When the module is fully inserted, the connector detects its presence. The connector also ejects the fully inserted module when a user desires to remove or change the module and lifts a retaining clip (502).

2 Claims, 7 Drawing Sheets

PORTABLE RADIOTELEPHONE EQUIPPED WITH A CONNECTOR HAVING EJECTION MECHANISM AND DETECTION SWITCH

FIELD OF THE INVENTION

The present invention relates generally to the field of portable radiotelephones. More specifically, the present invention relates to a portable radiotelephone equipped with an electrical connector having an eject mechanism and a detection switch.

BACKGROUND OF THE INVENTION

As portable electronic devices such as wireless radiotelephones and portable digital organizers (PDAs) become more advanced, and at the same time, become smaller, unutilized spaces within any of these more advanced and small devices become very limited. Yet, generally, consumers demand more functionality or usefulness from each successive generation of these portable electronic devices. Instead of providing all desired functions or circuits within a confined space of a more advanced and smaller electronic portable device, these desired blocks can be made separate accessory modules. By offering as modules, a user can enjoy interchangeability of modules. Examples of such accessory modules include extra battery, memory module, hands-free kit, and FM radio. Another example is a subscriber information module (SIM) card, which is an essential component for a radiotelephone in a network utilizing the global-system for mobile (GSM) standard.

An accessory module typically requires a physical connector pair, a connector in the portable device and a mating receptacle end on the module which may be incorporated into the module itself, in order to connect to a portable device. For a module that is small and does not extend out of the portable device when inserted, such as a SIM card, an ejection mechanism is also required to be able to remove the module. A switch that detects the presence of a module in the connector is also desirable.

Because the connector requires some physical space, which is at a premium in a portable electronic device such as radiotelephone, there is a need to develop a portable electronic device equipped with a small connector having an ejection mechanism and a detection switch.

SUMMARY OF THE INVENTION

The present invention describes a portable radiotelephone equipped with a connector having an ejection mechanism and a detect switch for an insertable module. The connector is simple in design and may be constructed from a single piece of metal sheet. A module, which adds functionality to the portable radiotelephone, is inserted into a module slot of the portable radiotelephone. When the module is fully inserted, a flexible conductive spring is flexed and makes a contact with a PC board contact completing the circuit for detecting the presence of the module in the module slot. In the flexed position, the flexible conductive spring stores enough energy to eject the fully inserted module from the module slot. When a user lifts a retaining clip, desiring to remove or to change the module, the flexible conductive spring releases its stored energy and ejects the module from the module slot.

DETAILED DESCRIPTION OF A PREFERRED EMBODIMENT

The present invention describes an electronic portable device capable of retaining a module inserted in a module slot, detecting a presence of the module in the module slot, and ejecting the module.

Figure 1:
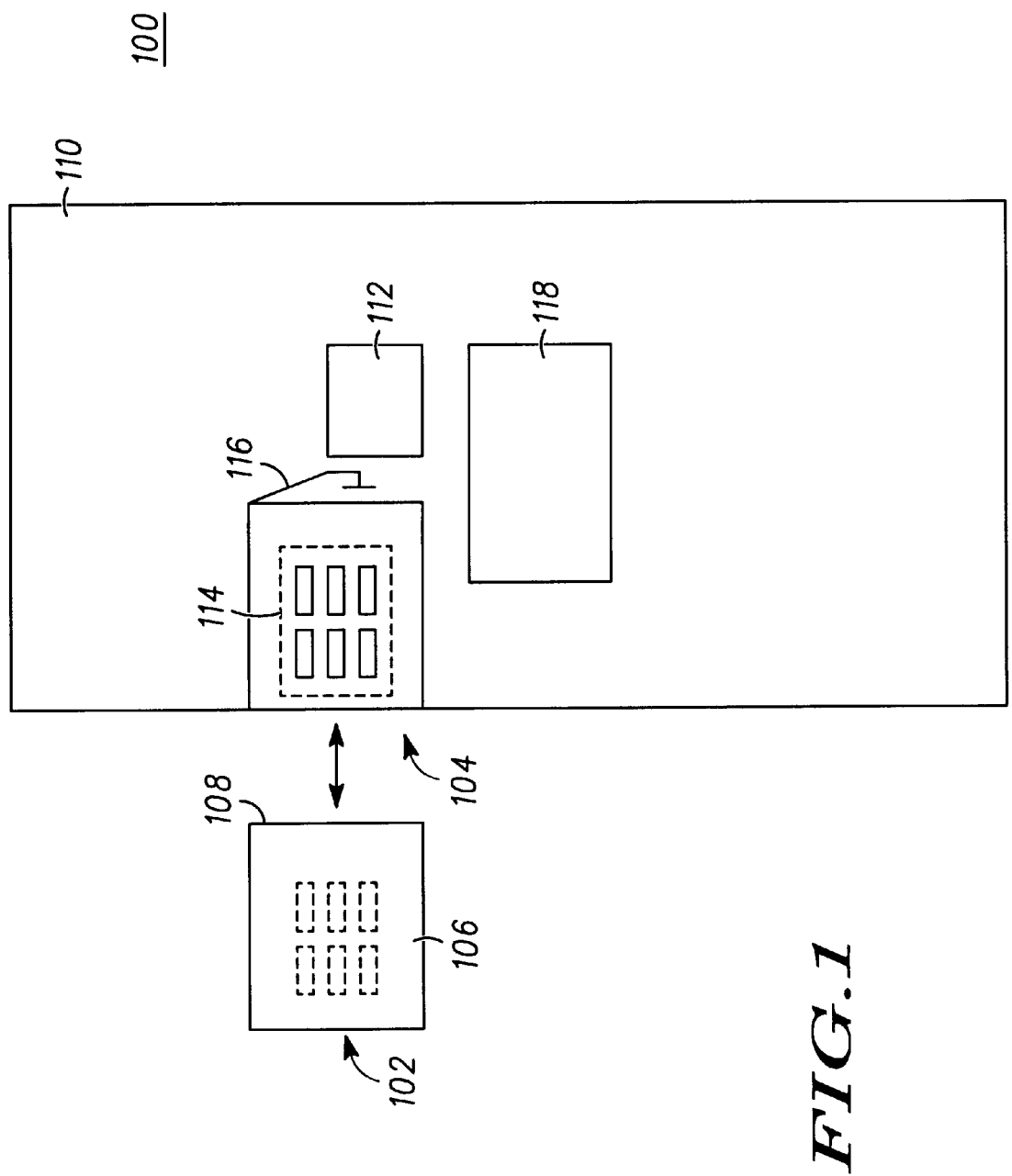
FIG. 1 illustrates a radiotelephone utilizing a connector having an ejection mechanism and a detection switch in accordance with the preferred embodiment of the present invention.

FIG. 1 illustrates a preferred embodiment of the present invention. An electronic portable device (100) accepts a module (102) in a module slot (104). The module (102) has a first surface containing module contacts (106) and a second surface (108) perpendicular to the first surface. The electronic portable device (100) comprises a printed circuit (PC) board (110) having a circuit (112) for detecting a presence of the module (102) in the module slot (104), a plurality of contacts (114) on the PC board (110) to make electrical contacts to the module (102), and a flexible conductive spring (116) which functions as an ejection mechanism and a detection switch. The detection switch is coupled to a processor (118) which processes information regarding the presence or non-presence of the module (102).

Figure 2:
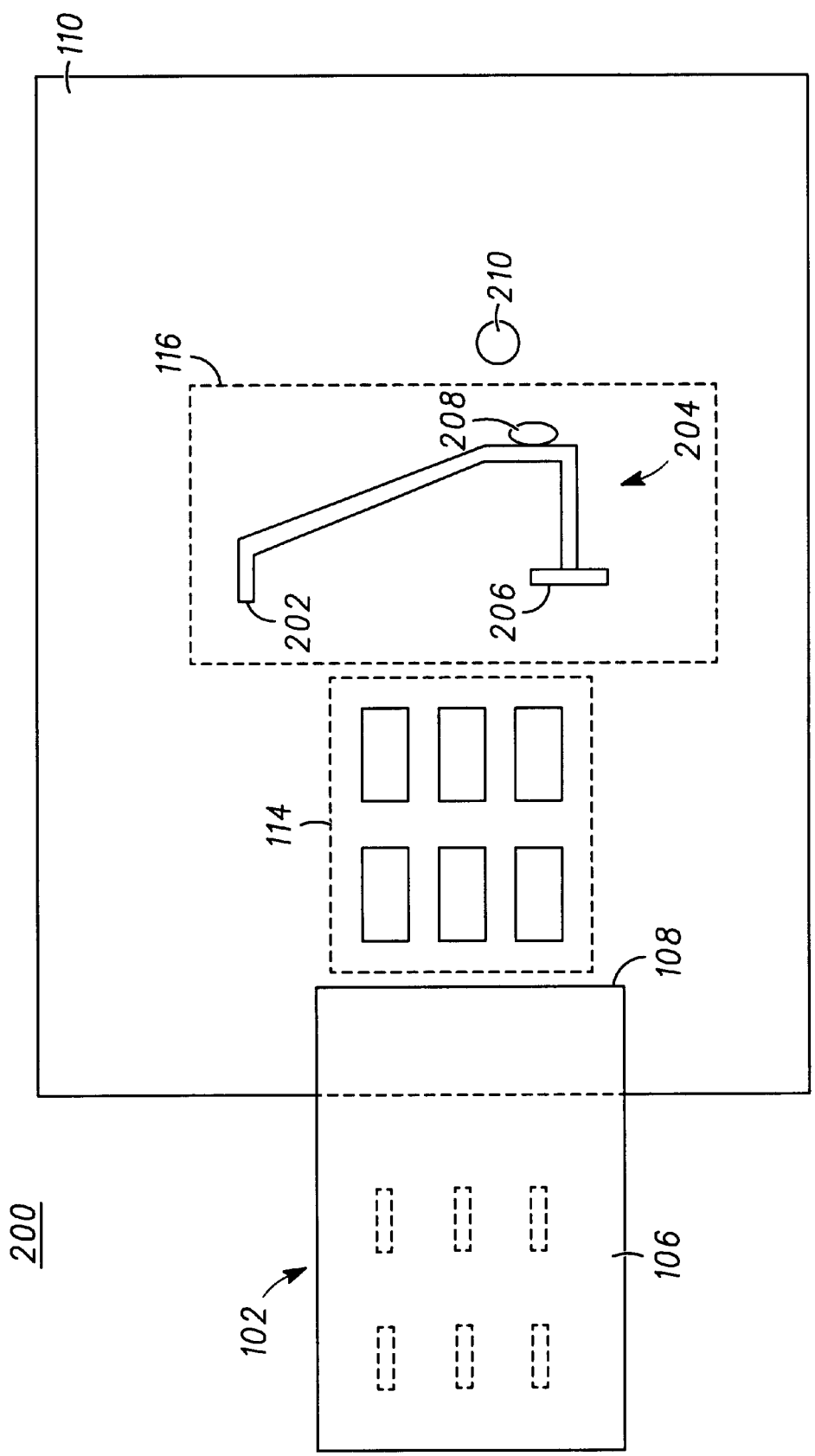
FIG. 2 illustrates the connector of FIG. 1 in a first position where a module is not fully inserted.

FIG. 2 illustrates a detailed description of the flexible conductive spring (116) used in the preferred embodiment of the present invention in a first position (200), where the module (102) is not fully inserted. The flexible conductive spring (116) comprise two ends. The first end (202) is fixed to the PC board (110). The second end (204) further comprises a module stop (206) and a spring contact (210) which are located on opposite sides of the spring. The module stop (206) makes a non-electrical contact with the second surface (108) of the module (102) as the module is inserted. The spring contact (208) makes an electrical contact with a PC board contact (210) when the module (102) is fully inserted, and completes the circuit for detecting the presence of the module in the module slot (104).

Figure 3:
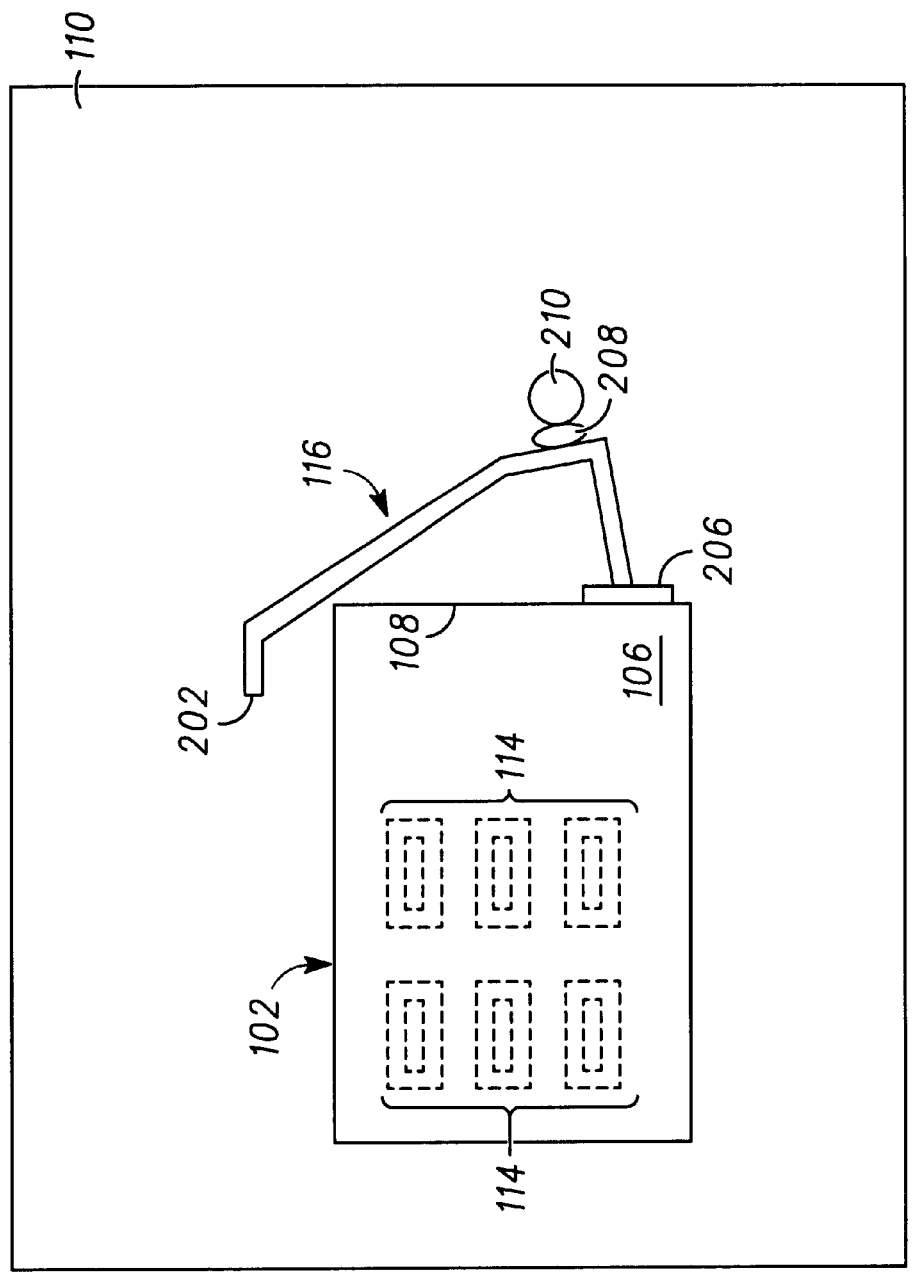
FIG. 3 illustrates the connector of FIG. 1 in a second position where the module is fully inserted.

FIG. 3 illustrates a detailed description of the flexible conductive spring (116) used in the preferred embodiment of the present invention in a second position (300), where the module (102) is fully inserted. The module stop (206) is in contact with the second surface (108) of the module (102), and the flexible conductive spring (116) is flexed such that the spring contact (208) makes an electrical contact with the PC board contact (210) completing the circuit for detecting the presence of the module in the module slot. By flexing the flexible conductive spring (116) from the first position (200) to the second position (300), the flexible conductive spring stores enough potential energy capable of exerting enough force to eject the module (102) from the module slot (104). Once the module is fully inserted, the module contacts (106) make electrical contacts with the plurality of contacts (114) on the PC boards, and the module provides additional functionality to the electronic portable device (100).

Figure 4:
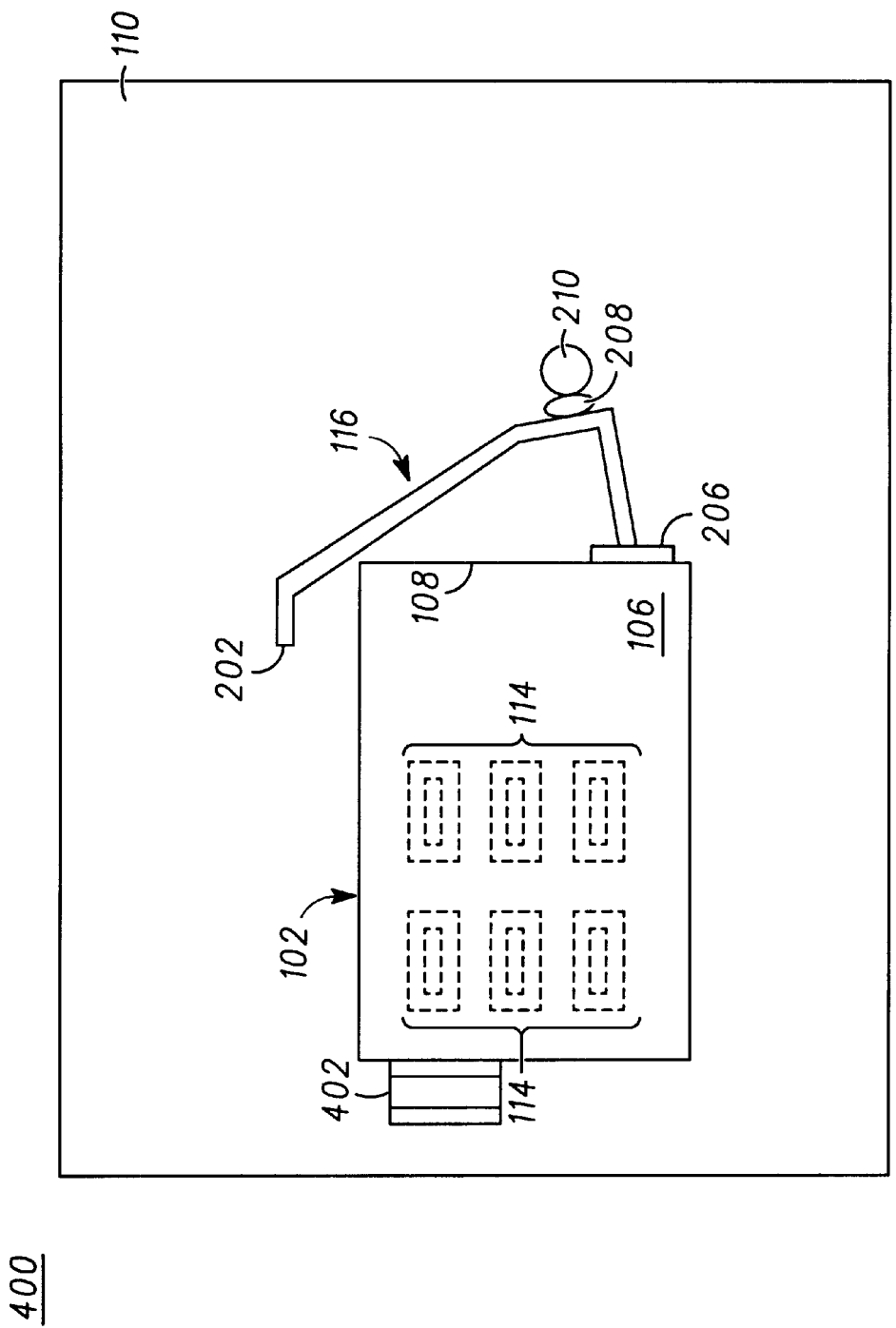
FIG. 4 illustrates the connector of FIG. 3 having a retaining clip.

FIG. 4 illustrates the module (102) fully inserted but is prevented from being ejected by a retaining clip (402) attached to the PC board (110). The retaining clip (402) is capable being flexed away from the module slot (104) as the module is inserted, but flexes back to its original position to prevent the module from inadvertently removed from the module slot when the module is fully inserted into the module slot.

Figure 5:
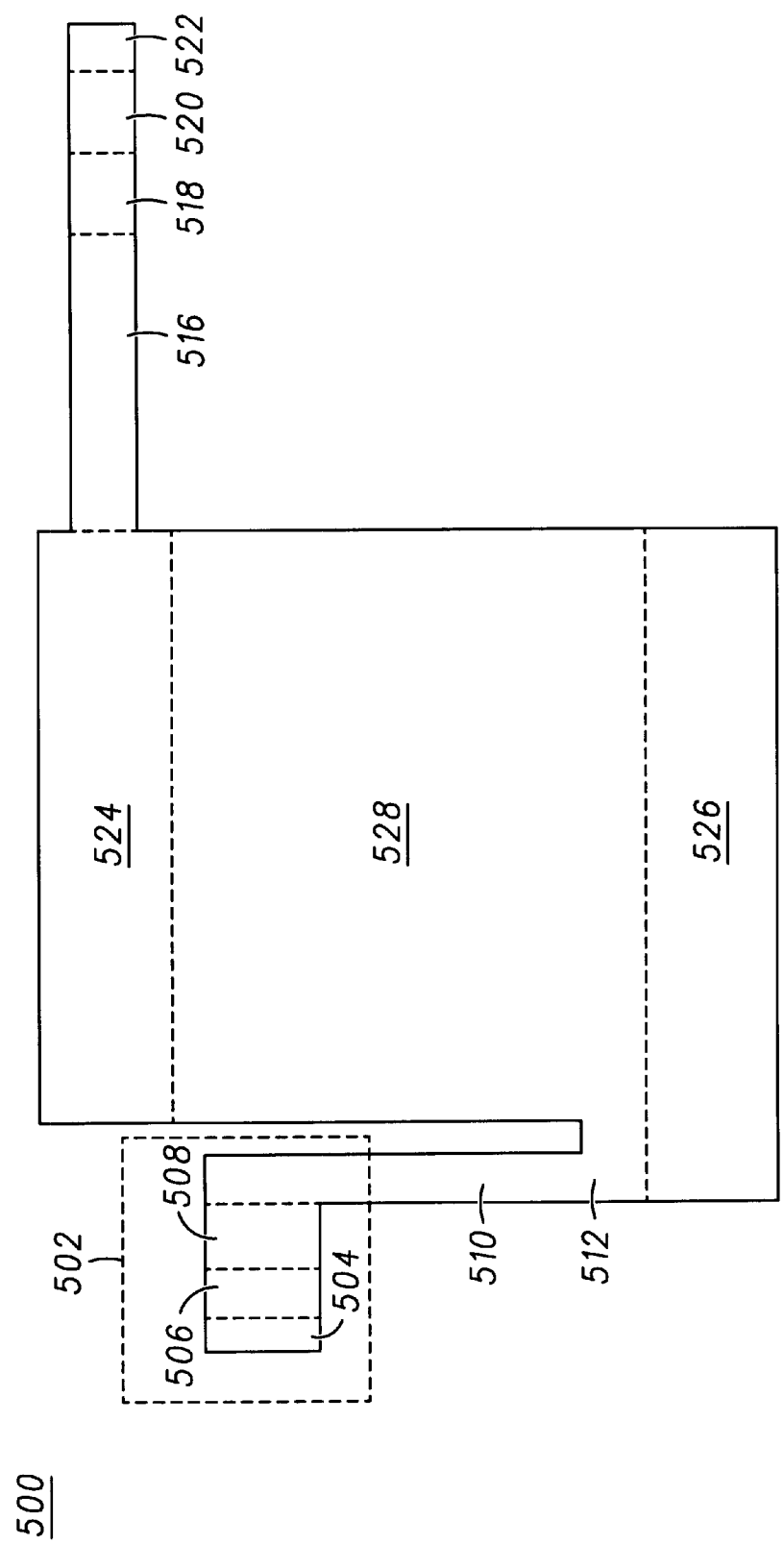
FIG. 5 illustrates an example of a one-piece design of the preferred embodiment of the present invention.

An example of a simple and cost effective one-piece spring-retainer combination is illustrated in FIG. 5. A retaining clip (502) is formed by folding first, second, and third sections (504, 506, and 508, respectively). An arm (510) from the retaining clip is able to flex at a base (512). A flexible conductive spring (514) is formed by folding sections 516, 518, 520, and 522. A main body comprising a first side (524), a second side (526), and a top (528), together with the PC board will form the module slot.

Figure 6:
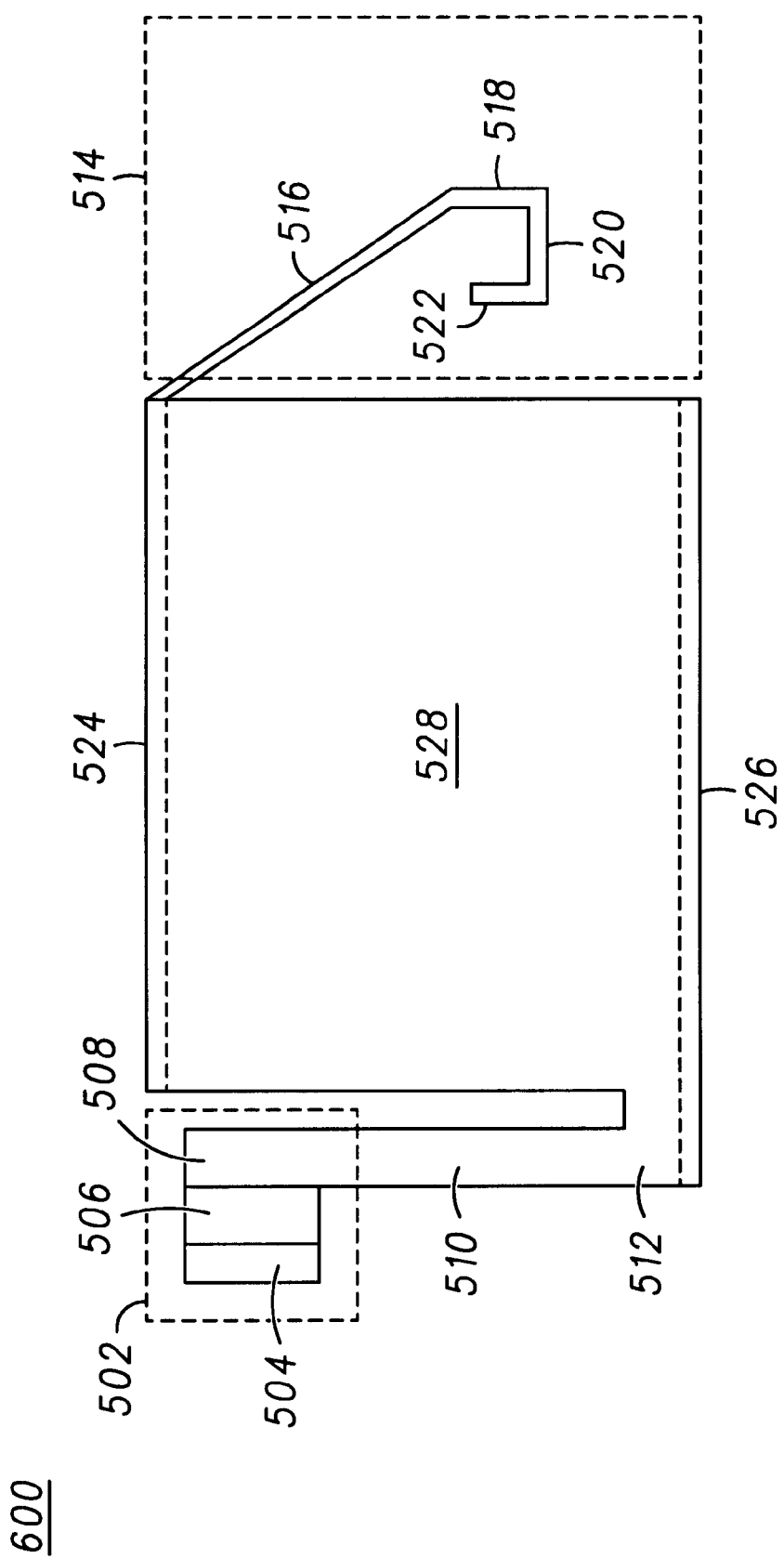
FIG. 6 illustrates a top view of the one-piece design of FIG. 5 properly formed; and, FIG. 7 illustrates a partial perspective view of the one-piece design of FIG. 6.

FIG. 6 illustrates a finished form (600) of the combination example (500). The flexible conductive spring (514) is able to flex at where it attaches to the first side (524) when the module is inserted, and is able to contact the PC board contact.

Figure 7:
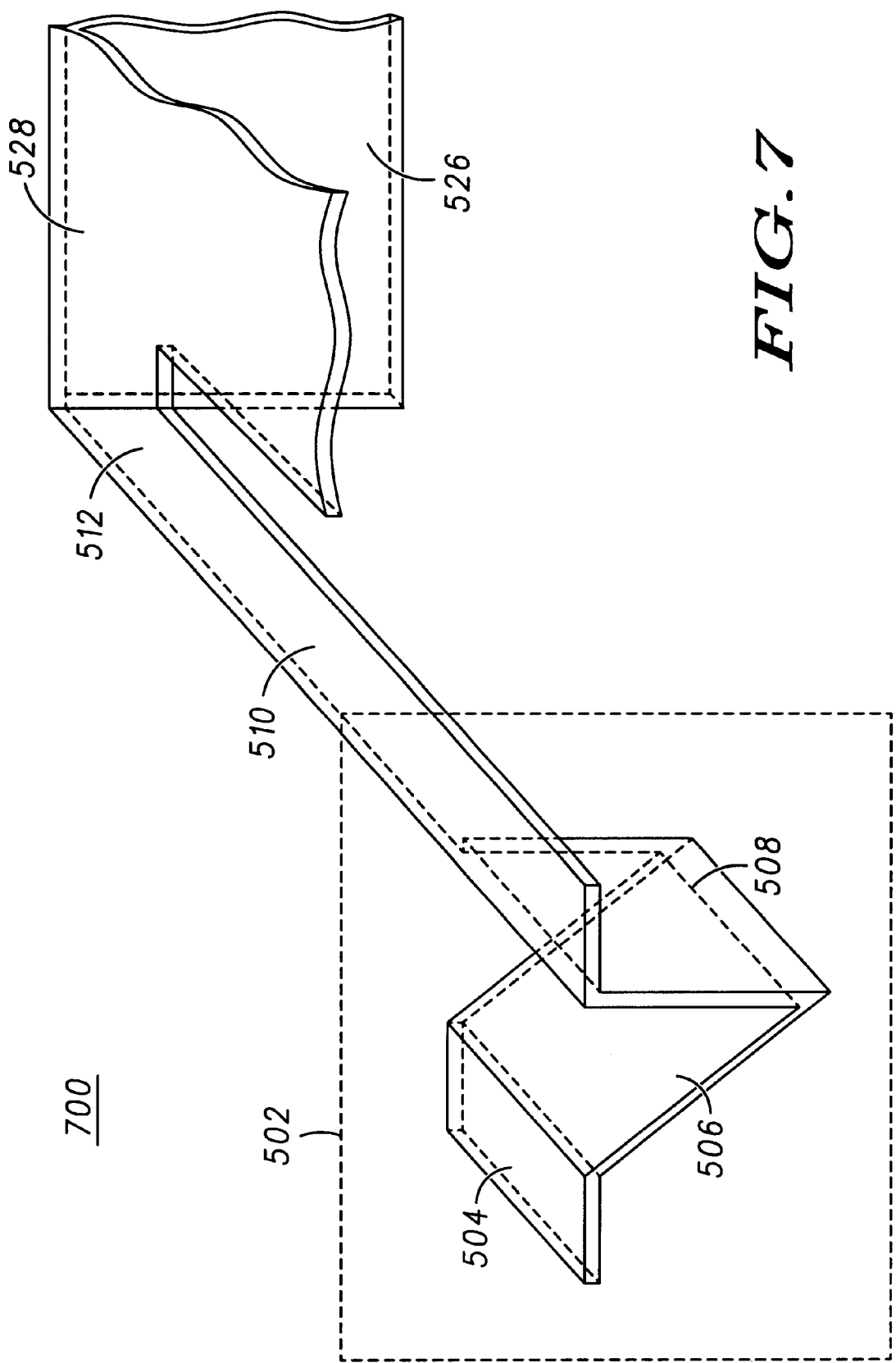

FIG. 7 illustrates detailed shape of the retaining clip. The third section (508) is substantially perpendicular to the arm (510) to prevent the module from forcing the retaining clip (502) away to prevent inadvertent removal of the module. When it is desired to remove the module, the first section (504) can be used to lift the retaining clip (502) by flexing the arm about the base (512) of the arm.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. An electronic portable device for retaining a module insertable in a module slot of the device, the device comprising:

a printed circuit (PC) board having a circuit for detecting a presence of the module in the module slot;

a plurality of contacts on the PC board to make electrical contact to the module;

a flexible conductive spring having first and second ends, the first end being attached to the PC board and the second end having first and second positions, the second end contacting a PC board contact to complete the circuit for detecting the presence of the module in the module slot when the second end moves from the first position to the second position, wherein the flexible conductive spring ejects the module from the module slot when the second end moves from the second position to the first position; and a retaining clip attached to the PC board capable of preventing the module from inadvertently removed from the module slot when the module is fully inserted into the module slot;

wherein the flexible conductive spring and the retaining clip are formed from a single sheet of metal.

2. An electronic portable device for retaining a module insertable in a module slot of the device, the device comprising:

a printed circuit (PC) board having a circuit for detecting a presence of the module in the module slot;

a plurality of contacts on the PC board to make electrical contact to the module;

a processor that reads data from the module upon the module being inserted in the module slot via the plurality of contacts on the PC board;

a transceiver coupled to the processor;

a display coupled to the processor;

a power supply coupled to the processor;

a flexible conductive spring having first and second ends, the first end being attached to the PC board remaining stationary against the PC board and the second end having first and second positions, the second end contacting a PC board contact to complete the circuit for detecting the presence of the module in the module slot when the second end moves from the first position to the second position, wherein the flexible conductive spring ejects the module from the module slot when the second end moves from the second position to the first position; the flexible conductive spring being a leaf spring having a semicircular shape; and a retaining clip attached to the PC board capable of preventing the module from inadvertently removed from the module slot when the module is fully inserted into the module slot;

wherein the module comprises first and second surfaces, the second surface being substantially perpendicular to the first surface, the first surface contacting the plurality of contacts and the second surface contacting the flexible conductive spring when the module is in the module slot, the plurality of contacts are the only direct electrical connection between the module and the PC board, and the flexible conductive spring and the retaining clip are formed from a single sheet of metal.

* * * * *